(12) United States Patent
Miyazawa et al.

(10) Patent No.: US 8,254,229 B2
(45) Date of Patent: Aug. 28, 2012

(54) OPTICAL INFORMATION RECORDING APPARATUS AND METHOD

(75) Inventors: Fuyuki Miyazawa, Tokyo (JP); Hiroya Kakimoto, Tokyo (JP); Katsuhiro Oyama, Tokyo (JP)

(73) Assignee: Taiyo Yuden Co., Ltd, Tokyo (JP)

( * ) Notice: Subject to any disclaimer, the term of this patent is extended or adjusted under 35 U.S.C. 154(b) by 19 days.

(21) Appl. No.: 12/746,312

(22) PCT Filed: Dec. 11, 2008

(86) PCT No.: PCT/JP2008/072561
§ 371 (c)(1),
(2), (4) Date: Jun. 4, 2010

(87) PCT Pub. No.: WO2009/081757
PCT Pub. Date: Jul. 2, 2009

(65) Prior Publication Data
US 2010/0260019 A1     Oct. 14, 2010

(30) Foreign Application Priority Data

Dec. 26, 2007  (JP) .................................. 2007-335293
Nov. 17, 2008  (JP) .................................. 2008-292937

(51) Int. Cl.
*G11B 9/07* (2006.01)
(52) U.S. Cl. ..................................... 369/47.5; 369/59.11
(58) Field of Classification Search .................. 369/47.5, 369/47.51, 47.52, 47.53, 59.11
See application file for complete search history.

(56) References Cited

U.S. PATENT DOCUMENTS

| 5,487,059 | A | 1/1996 | Saito et al. | |
|---|---|---|---|---|
| 7,218,593 | B2 * | 5/2007 | Kato | 369/59.11 |
| 7,570,563 | B2 * | 8/2009 | Yuzurihara et al. | 369/59.11 |
| 7,646,692 | B2 * | 1/2010 | Ishimi et al. | 369/59.11 |
| 7,729,223 | B2 * | 6/2010 | Ishimi | 369/59.11 |
| 7,733,750 | B2 * | 6/2010 | Takeuchi | 369/47.53 |
| 7,751,290 | B2 * | 7/2010 | Kuijper et al. | 369/53.2 |
| 7,916,603 | B2 * | 3/2011 | Kato | 369/59.12 |
| 2005/0201243 | A1 * | 9/2005 | Ishimi et al. | 369/59.12 |

(Continued)

FOREIGN PATENT DOCUMENTS

EP     0 802 531 A2    10/1997

(Continued)

OTHER PUBLICATIONS

Extended European Search Report issued in European Application No. 08865737.4 dated May 13, 2011.

(Continued)

*Primary Examiner* — Aristotelis Psitos
(74) *Attorney, Agent, or Firm* — Oliff & Berridge, PLC

(57) ABSTRACT

In order to ensure a favorable recording characteristic for a write-once recording medium whose recording layer is made of an organic dye having an absorption spectrum at a wavelength λ=405 nm, this optical information recording apparatus includes a unit to set a write power to form recording marks, a space forming power to form spaces and a pulse width of a cooling pulse, and a unit to record information onto the recording medium according to the setting. The pulse width of the cooling pulse and a ratio of the space recording power to the write power are determined from a favorable region in a plane whose one coordinate axis represents the ratio and whose other coordinate axis represents the pulse width of the cooling pulse.

15 Claims, 10 Drawing Sheets

U.S. PATENT DOCUMENTS

| | | |
|---|---|---|
| 2005/0286383 A1 | 12/2005 | Mizushima et al. |
| 2007/0195674 A1 | 8/2007 | Ishimi |

FOREIGN PATENT DOCUMENTS

| | | |
|---|---|---|
| JP | A 6-203383 | 7/1994 |
| JP | A 9-282660 | 10/1997 |
| JP | A 10-83553 | 3/1998 |
| JP | A 2001-176072 | 6/2001 |
| JP | A 2004-178619 | 6/2004 |
| JP | A 2006-48898 | 2/2006 |

OTHER PUBLICATIONS

International Search Report issued in corresponding International Application No. PCT/JP2008/072561, mailed Mar. 17, 2009.

* cited by examiner

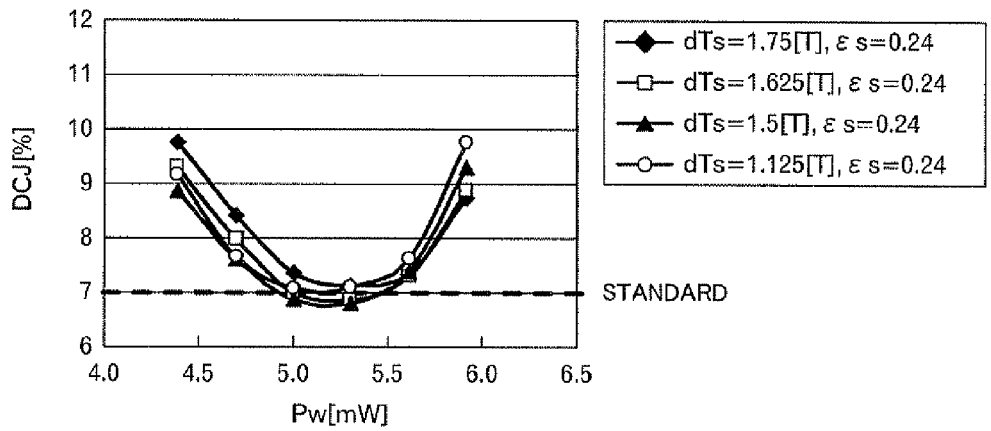
FIG.7
| 2x | εs | | | | | | |
|---|---|---|---|---|---|---|---|
|  | 0.18 | 0.20 | 0.22 | 0.24 | 0.26 | 0.28 | 0.30 | 0.32 |
| dTs[T] | — | 1.5 ~ 1.9325 | 1.375 ~ 1.75 | 1.25 ~ 1.625 | 1.125 ~ 1.5 | 1.0 ~ 1.3125 | 0.875 ~ 1.125 | — |
FIG.8
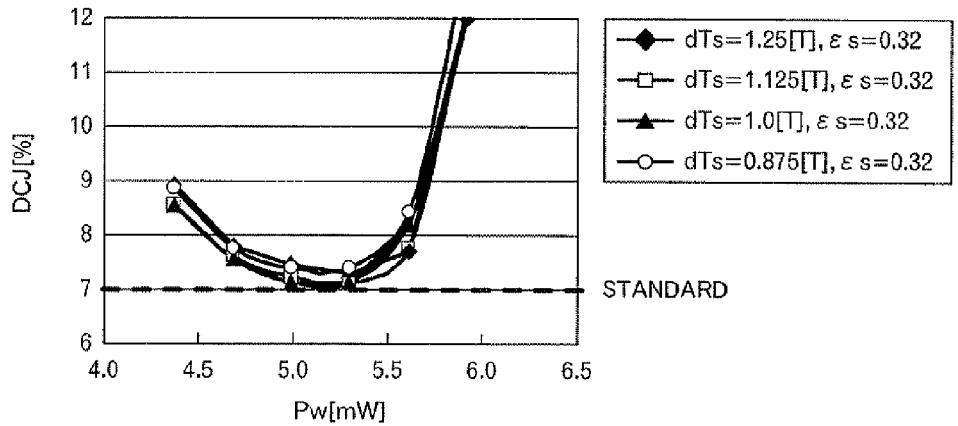
FIG.9

| 2x | dTs[T] | | | | | | | |
|---|---|---|---|---|---|---|---|---|
| | 1.9325 | 1.75 | 1.625 | 1.5 | 1.375 | 1.25 | 1.125 | ... |
| $\varepsilon s$ | 0.20 | 0.20 ~ 0.22 | 0.20 ~ 0.24 | 0.20 ~ 0.26 | 0.22 ~ 0.26 | 0.24 ~ 0.28 | 0.26 ~ 0.30 | |

Ps: SPACE POWER    LDH: TOP PULSE LENGTH
Pw: WRITE POWER    dTtop: PHASE GAP OF TOP PULSE LENGTH
Pm: MIDDLE POWER   TBST: LAST PULSE LENGTH
Pc: COOLING POWER  dTlast: PHASE GAP OF LAST PULSE LENGTH
                   dTs: COOLING PULSE LENGTH

OPTICAL INFORMATION RECORDING APPARATUS AND METHOD

TECHNICAL FIELD

This invention relates to a technique to appropriately carry out data recording to an optical information recording medium whose recording layer is made of an organic dye having an absorption spectrum at a wavelength λ=405 nm by a laser (hereinafter, abbreviated as "a bluish-purple laser"), which oscillates at wavelengths of 405 nm and its adjacent range.

BACKGROUND TECHNOLOGY

The optical information recording medium such as a write-once type CD (hereinafter, abbreviated as "CD-R"), a write-once type DVD (hereinafter, abbreviated as "DVD-R"), a write-once type HD-DVD (hereinafter, abbreviated as "HD-DVD-R"), and a write-once type blu-ray disc (hereinafter, abbreviated as "BD-R") has a structure in which a recording layer, reflection layer and cover layer, if necessary, are formed on one surface of a optical penetrating disc substrate. In addition, on one surface of the substrate in which the recording layer and reflection layer are formed, a screw or concentric-circle ditch, which is called "groove", is formed, and a convex portion, which is called "land", is formed between adjacent grooves. By irradiating the recording laser beam onto a recording layer on the groove of such an optical information recording medium by the optical information recording and playback apparatus, while carrying out the tracking along the ditch to form the recording marks, the recording is carried out. The playback is carried out by irradiating the regenerative laser beam onto the length nT (the cycle of the reference clock is T, and nT represents the length of integral multiple of T) of the recording mark, the length nT of a portion (hereinafter, called space) between the recording mark and another recording mark and these arrangements to convert the reflection light to the regenerative signal.

As for CD-R and DVD-R, which are write-once type optical information recording mediums whose recording layer is made of the conventional organic dye, because the thermal reactivity of the used organic dye is favorable, the data recording is always kept to be favorable by applying a power condition in which the power is not outputted as much as possible in a region to form the space. Namely, for example, as depicted in FIG. 1, when a recording mark of 2T (hereinafter, abbreviated as "P2T") is formed, then a space is formed, and further a recording mark of 8T (hereinafter, abbreviated as "P8T") is formed, the level of a space forming power Ps, which is a power to form space, is equal to the level of a power Pc of a cooling pulse outputted immediately after the pulse of the write power Pw, which is the recording power to form the recording marks. Of course, a ratio $\epsilon_s$ of the space forming power Ps to the write power Pw is equal to a ratio $\epsilon_c$ of the power Pc of the cooling pulse to the write power Pw. Incidentally, when the recording mark P8T is formed by the multi-pulse type write strategy, plural pulses of the write power Pw are formed and after the respective pulses, a period is provided for which a bias power Pb is outputted.

However, as for HD-DVD-R and BD-R, which are the write-once type optical information recording medium for the bluish-purple laser, whose recording layer is made of the organic dye having the absorption spectrum at the wavelength λ=405 nm, it is known that the thermal reactivity of the organic dye is slower than that of the organic dye used for CD-R and DVD-R. On the other hand, in the writing to CD-R, DVD-R or the like, as depicted in FIG. 2, a strategy is adopted in which the remaining heat is given to a region to form the space after the cooling pulse whose pulse width dTs by applying the space forming power Ps whose value is greater than the power value of the power Pc of the cooling pulse and less than the power value of the write power Pw and the cooling pulse width dTs is provided, whereby the mark is easily formed.

JP-A-2006-48898 for HD-DVD-R and BD-R, which are the write-once type optical information recording medium for the bluish-purple laser, whose recording layer is made of the inorganic material having the absorption spectrum at the wavelength λ=405 nm, discloses a technique for forming a recording mark with high accuracy without causing heat interference between consecutive recording marks and cross-erasure between the recording marks in adjacent tracks or the like, onto a recording layer with high light transmittance such as an L1 layer of a double-layer optical recording medium. Specifically, when recording onto a semitransparent recording film with high light transmittance, a laser beam is pulse-modulated to emit a series of pulses including the write pulse of the recording power and the cooling pulse of a bottom power. After that, the recorded data is modulated to the length of the recording mark along the track of the recording layer, while the length of the recording mark corresponds to nT, which is an integral multiple of T, when one clock cycle is T. It is disclosed that this recording mark nT, which corresponds to nT, is formed by (n−1) write pulses, and when a recording mark equal to or longer than 4T is formed, a cooling pulse whose pulse width is from 0.8T to 2T is inserted before the last write pulse. However, this publication is a document for the write strategy regarding the phase change recording of the inorganic material, and this document does not describe the write-once type optical information recording medium for the bluish-purple laser, whose recording layer is made of the organic dye having the absorption spectrum at the wavelength λ=405 nm.

Patent Document 1: JP-A-2006-48898

SUMMARY OF THE INVENTION

Problem to be Solved by this Invention

Thus, although the countermeasure for the thermal interference of the optical information recording medium whose recording layer is made of the inorganic material is disclosed, the countermeasure for the thermal interference of the write-once type optical information recording medium for the bluish-purple laser, whose recording layer is made of the organic dye having the absorption spectrum at the wavelength λ=405 nm has not been disclosed in documents, and it is difficult for the technique described in the aforementioned publication to ensure sufficient recording characteristic.

Namely, when the data recording is carried out onto the write-once type optical information recording medium whose recording layer is made of the organic dye having the absorption spectrum at the wavelength λ=405 nm by a laser power waveform of the write strategy as depicted in FIG. 2, a problem came to be recognized that the influence of the thermal interference occurs at the mark recording because the space forming power Ps and the pulse width dTs of the cooling pulse change, and the recording characteristic deteriorates.

Therefore, an object of this invention is to provide a new technique to ensure the favorable recording characteristic for the write-once type optical information recording medium for the bluish-purple laser, whose recording layer is made of the organic dye having the absorption spectrum at the wavelength at the wavelength λ=405 nm.

Means for Solving the Problem

An information recording apparatus relating to a first viewpoint of this invention is constitution for recording information by forming recording marks and spaces onto an optical information recording medium whose recording layer is made of an organic dye having a predetermined absorption ratio to a light whose wavelength is 405 nm by irradiating a laser of adjacent range wavelengths including said wavelength of 405 nm. Then, this optical information recording apparatus includes setting means for respectively setting a write power to form the recording marks, a space forming power whose power value is less than the write power, to form the spaces, and a pulse width of a cooling pulse whose power value is less than the space forming power and which is output immediately after a last pulse when the recording mark is formed; and means for recording information onto the optical information recording medium according to the setting means. In this constitution, the pulse width of the cooling pulse and a ratio whose denominator is the write power and whose numerator is the space forming power are determined from a pre-measured favorable region in a plane of rectangular coordinates in which one coordinate axis corresponds to the ratio and the other coordinate axis corresponds to the pulse width of the cooling power.

As for an optical information recording apparatus relating to a second viewpoint of this invention, in the aforementioned optical information recording apparatus relating to the first viewpoint, the pulse width of the cooling pulse and the ratio whose denominator is the write power and whose numerator is the space forming power are determined based on results of test recording in which a numeric value in either of the coordinate axes in a range of the favorable region is fixed and a plurality of points are selected along the other coordinate axis in a range of the favorable region in the plane of rectangular coordinates in which one coordinate axis is the ratio and the other coordinate axis is the pulse width of the cooling power.

The optical information recording apparatuses of the first and second viewpoints, for carrying out the recording to the optical information recording medium whose recording layer is made of the organic dye appropriately sets the pulse width of the cooling pulse and the predetermined ratio of the space forming power to the write power so as to form a "favorable region" in a plane of rectangular coordinates in which one coordinate axis corresponds to the predetermined ratio and the other coordinate axis corresponds to the pulse width of the cooling pulse. Accordingly, the countermeasure for the thermal interference is appropriately carried out, and the favorable recording characteristic is ensured.

Furthermore, in the optical information recording apparatus relating to the second viewpoint of this invention, not only one of them is optimized, but also a numeric value on the coordinate axis of the optimized one may be fixed and an optimized numeric value on the other coordinate axis may be determined based on results of test recording in which numeric values on the other coordinate axis are tested in a range of the favorable region. By doing so, it becomes possible to carry out preferable recording because the writing to the optical information recording medium is much optimized.

Incidentally, when recording is carried out at double-speed, the favorable region is a range connecting, by straight lines, points (0.2, 1.9375T), (0.2, 1.5T), (0.3, 1.125T) and (0.3, 0.875T), which respectively represent a combination of the ratio and the pulse width of said cooling pulse in the plane of rectangular coordinates, and T represents a cycle of a reference clock. Because this range is common to the double-speed recording in the inventions of the respective viewpoints, explanation is omitted in the subsequent viewpoints. By such a favorable region, the pulse width of the cooling pulse and the predetermined ratio of the space forming power to the write power are set so as to satisfy requirements determined in the standard and the like. Incidentally, other region may be appropriate for the speed other than the double-speed recording.

As for the optical information recording apparatus relating to a third viewpoint of this invention, only portions different from the optical information recording apparatus relating to the first viewpoint will be described. The optical information recording apparatus relating the third viewpoint of this invention has obtaining means for obtaining a favorable region obtained based on a preferable range of the ratio and a preferable range of the pulse width of the cooling pulse in the aforementioned plane of rectangular coordinates, from a recording source, which has recorded the favorable region in advance; means for optimizing a value of the write power and a value of the pulse width included in a range of the pulse width of the cooling pulse based on results of test recording carried out plural times in a test recording region of the optical information recording medium; setting means for setting an optimum value of the write power, a value of the space forming power, which is obtained from the optimum value of the write power and the ratio, and an optimum value of the pulse width of the cooling pulse; and means for recording information onto the optical information recording medium according to such setting means.

Thus, by adjusting the pulse width of the cooling pulse to a value presumed to be optimized in the favorable region in the aforementioned plane of rectangular coordinates, it is possible to carry out appropriate setting adapted to the present environment, and to ensure the favorable recording characteristic.

Furthermore, the obtaining means obtains, according to the recording speed, from a memory that is the recording source in the optical information recording apparatus or the optical information recording medium that is said recording source, the ratio whose denominator is the write power to form the recording mark and whose numerator is the space forming power whose power value is less than the write power, to form the spaces, and a range of the pulse width of the cooling pulse, wherein the range of the pulse width of the cooling pulse forms the favorable region with the ratio in the plane of rectangular coordinates. By holding the aforementioned data on the optical information recording medium, it becomes possible to use setting data adapted to that optical information recording medium.

As for the optical information recording apparatus relating to a fourth viewpoint of this invention, portions different from the optical information recording apparatus relating to the first viewpoint will be explained, predominantly. The optical information recording apparatus relating to the fourth viewpoint of this invention has obtaining means for obtaining a favorable region obtained from a preferable range of the ratio and a preferable range of the pulse width of the cooling pulse, in the plane of rectangular coordinates, from a recording source, which has recorded the favorable region in advance; means for optimizing a value of the write power and a value of the ratio included in the range of the ratio, based on results of test recording carried out plural times in a test recording region of the optical information recording medium; setting means for setting an optimum value of the write power, a value of the space forming power, which is obtained from the optimum value of the write power and an optimum value of the ratio, and a value of the pulse width of the cooling pulse; and means for recording information onto the optical information recording medium according to the setting means.

Thus, by adjusting the ratio of the space forming power to the write power to a value presumed to be optimized in the favorable region in the plane of rectangular coordinates, it is possible to carry out appropriate setting adapted to the present environment to ensure the favorable recording.

As for the optical information recording apparatus relating to a fifth viewpoint of this invention, portions different from the optical information recording apparatus relating to the third viewpoint will be explained, predominantly. The optical information recording apparatus relating to the fifth viewpoint of this invention has obtaining means for obtaining a favorable region obtained based on a preferable range of the ratio and a preferable range of the pulse width of the cooling pulse, in the plane of rectangular coordinates, from a recording source, which has recorded the favorable region in advance; means for optimizing a value of the write power, a value of the ratio and a value of the pulse width of the cooling pulse, which corresponds to the ratio, based on results of test recording carried out plural times in a test recording region of the optical information recording medium; setting means for setting an optimum value of the write power, a value of the space forming power, which is obtained from the optimum value of the write power and an optimum value of the ratio, and an optimum value of the pulse width of the cooling pulse; and means for recording information onto the optical information recording medium according to the setting means.

Thus, the write power, the pulse width of the cooling pulse and the ratio may be optimized and set, respectively.

An optical information recording method is a procedure including recording information by forming recording marks and spaces onto an optical information recording medium whose recording layer is made of an organic dye having a predetermined absorption ratio to a light whose wavelength is 405 nm by irradiating a laser of adjacent range wavelengths including said wavelength of 405 nm. The optical information recording method especially includes respectively setting a write power to form the recording marks, a space forming power whose power value is less than the write power to form the spaces and a pulse width of a cooling pulse whose power value is less than the space forming power and which is output immediately after a last pulse when the recording mark is formed; and recording information onto the optical information recording medium according to the setting. Then, the space forming power is determined by the write power and the ratio, which were read out in advance from the recording source, and the pulse width of the cooling pulse is determined based on a ratio whose denominator is the write power and whose numerator is the space forming power, wherein the ratio is identified from a favorable region determined from pre-measured results, in the plane of rectangular coordinates in which one coordinate axis corresponds to the ratio and the other coordinate axis corresponds to the pulse width of the cooling pulse.

As for an optical information recording method relating to a second viewpoint of this invention, in the aforementioned optical information recording method relating to the first viewpoint, the pulse width of the cooling pulse and the ratio whose denominator is the write power and whose numerator is the space forming power are determined based on results of test recording in which a numeric value in either of the coordinate axes in a range of the favorable region is fixed and a plurality of points are selected along the other coordinate axis in a range of the favorable region in the plane of rectangular coordinates in which one coordinate axis is the ratio and the other coordinate axis is the pulse width of the cooling power.

The methods of the first and second viewpoints, for carrying out the recording to the optical information recording medium whose recording layer is made of the organic dye appropriately sets the pulse width of the cooling pulse and the predetermined ratio of the space forming power to the write power so as to form a "favorable region" in the plane of rectangular coordinates in which one coordinate axis corresponds to the predetermined ratio and the other coordinate axis corresponds to the pulse width of the cooling pulse. Accordingly, the countermeasure for the thermal interference is appropriately carried out, and the favorable recording characteristic is ensured.

Furthermore, in case of the aforementioned optical information recording method relating to the first viewpoint, not only the numeric value on one of the coordinate axes is optimized, but also a numeric value on the coordinate axis that the numeric value was optimized is fixed and an optimized numeric value on the other coordinate axis is determined based on results of test recording in which numeric values on the other coordinate axis are tested in a range of the favorable region, whereby the writing to the optical information recording medium is optimized and it is possible to carry out much preferable recording.

Incidentally, when recording is carried out at double-speed, the favorable region is a range connecting, by straight lines, points (0.2, 1.9375T), (0.2, 1.5T), (0.3, 1.125T) and (0.3, 0.875T), which respectively represent a combination of the ratio and the pulse width of said cooling pulse in the plane of rectangular coordinates, and T represents a cycle of a reference clock. Thus, the pulse width of the cooling pulse and the predetermined ratio of the space forming power to the write power are set so as to satisfy requirements determined in the standard and the like.

A optical information recording method relating to the third viewpoint of this invention has a similar concept to the optical information recording method relating to the first viewpoint. This optical information recording method has obtaining a favorable region obtained based on a preferable range of a pulse width of a cooling pulse, which corresponds to plural fixed values of a ratio whose denominator is a write power to form the recording mark and whose numerator is a space forming power whose power value is less than the write power, to form the spaces, in a plane of rectangular coordinates in which one coordinate axis corresponds to the ratio and the other coordinate axis corresponds to the pulse width of the cooling pulse whose power value is less than the space forming power and which is output immediately after a last pulse when the recording mark is formed, from a recording source, which has recorded the favorable region in advance. Furthermore, the optical information recording method includes optimizing a value of the write power and a value of the pulse width included in a range of the pulse width of the cooling pulse based on results of test recording carried out plural times in a test recording region of said optical information recording medium. In addition, the optical information recording method includes setting an optimum value of the write power, a value of the space forming power, which is obtained from the optimum value of the write power and the ratio, and an optimum value of the pulse width of the cooling pulse. Then, the optical information recording method includes recording information onto the optical information recording medium according to the setting.

Thus, by adopting the aforementioned method, by adjusting the pulse width of the cooling pulse to a value presumed to be optimized in the favorable region in the aforementioned plane of rectangular coordinates, it is possible to carry out appropriate setting adapted to the present environment, and to ensure the favorable recording characteristic.

An optical information recording method relating to the fourth viewpoint of this invention has a similar concept to the optical information recording method relating to the first viewpoint. This optical information recording method includes obtaining a favorable region obtained based on a preferable range of a ratio, which corresponds to a preferable range of a pulse width of a cooling pulse whose power value is less than the space forming power and which is output immediately after a last pulse when the recording mark is formed, in a plane of rectangular coordinates in which one coordinate axis corresponds to the ratio whose denominator is a write power to form the recording mark and whose numerator is a space forming power whose power value is less than the write power, to form the spaces, and the other coordinate axis corresponds to the pulse width of the cooling pulse, from a recording source, which has recorded the favorable region in advance. Furthermore, the optical information recording method includes optimizing a value of the write power and a value of the ratio included in a range of the ratio based on results of test recording carried out in a test recording region of the optical information recording medium; and setting an optimum value of the write power, a value of the space forming power, which is obtained from the optimum value of the write power and an optimum value of the ratio, and a value of the pulse width of the cooling pulse. The optical information recording method includes recording information onto the optical information recording medium according to the setting.

As described above, by adjusting the ratio of the space forming power to the write power to a value presumed to be optimized in the favorable region in the plane of rectangular coordinates, it is possible to carry out appropriate setting adapted to the present environment to ensure the favorable recording.

An optical information recording method relating to the fifth viewpoint of this invention has a similar concept to the optical information recording method relating to the first viewpoint. This optical information recording method includes obtaining a favorable region obtained based on a preferable range of a pulse width of a cooling pulse, which corresponds to a preferable range of a ratio whose denominator is a write power to form said recording mark and whose numerator is a space forming power whose power value is less than said write power, to form said spaces, in a plane of rectangular coordinates in which one coordinate axis corresponds to said ratio and the other coordinate axis corresponds to said pulse width of said cooling pulse whose power value is less than said space forming power and which is output immediately after a last pulse when said recording mark is formed, from a recording source, which has recorded said favorable region in advance. Moreover, the optical information recording method includes optimizing a value of the write power, a value of the ratio and a value of the pulse width of the cooling pulse, which corresponds to the ratio, based on results of test recording carried out at plural points in a test recording region of the optical information recording medium. Furthermore, the optical information recording method includes setting an optimum value of the write power, a value of the space forming power, which is obtained from the optimum value of the write power and an optimum value of the ratio, and an optimum value of the pulse width of the cooling pulse. The optical information recording method includes recording information onto the optical information recording medium according to the setting.

Thus, the write power, the pulse width of the cooling power and the ratio may be optimized, respectively, to set them, and the DC jitter [%] and asymmetry value clear their references of the standards. Simultaneously, a thermal interference amount [ns] satisfies a requirement determined in the standards and the like.

An optical information recording apparatus relating to a sixth viewpoint of this invention may be realized by a combination of a program for causing its processor to execute the aforementioned processing and a hardware, and the program is stored, for example, in a storage medium or a storage device such as a flexible disk, an optical disc such as CD-ROM, an magneto-optical disc, a semiconductor memory, or the hard disk, or a non-volatile memory in the processor. In addition, the program may be distributed as digital signals through a network. Incidentally, intermediate processing data is temporarily stored in a storage device such as the memory of the processor.

BRIEF DESCRIPTION OF THE DRAWINGS

FIG. 7 is a diagram representing a relation between a write power Pw and DCJ in case of changing dTs while fixing $\epsilon_s$ to 0.24;

FIG. 8 is a diagram depicting a range of dTs based on $\epsilon_s$;

FIG. 9 is a diagram representing the relation between the write power Pw and DCJ in case of changing dTs while fixing $\epsilon_s$ to 0.32;

BEST MODE FOR CARRYING OUT THE INVENTION

Principle of this Embodiment

Figure 1:
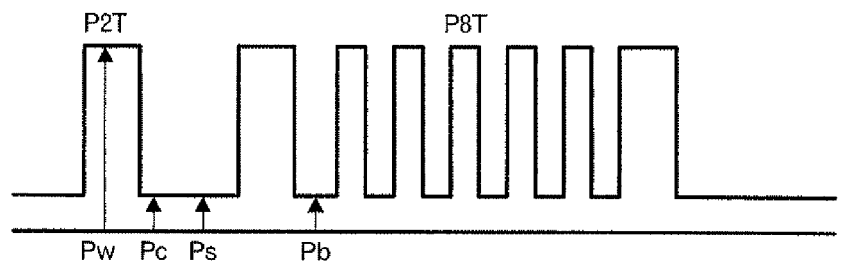
FIG. 1 is a diagram depicting an example of a conventional write strategy.
Figure 2:
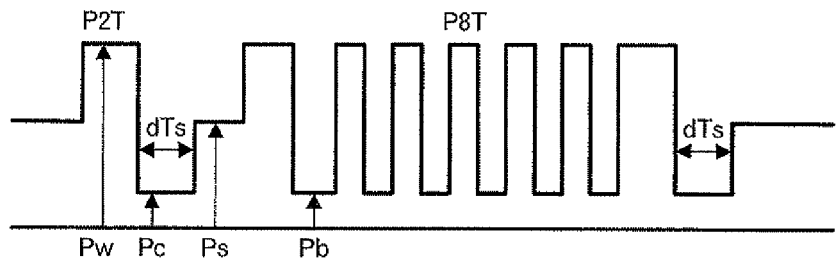
FIG. 2 is a diagram depicting an example of a write strategy for a high-density optical information recording medium.
Figure 3:
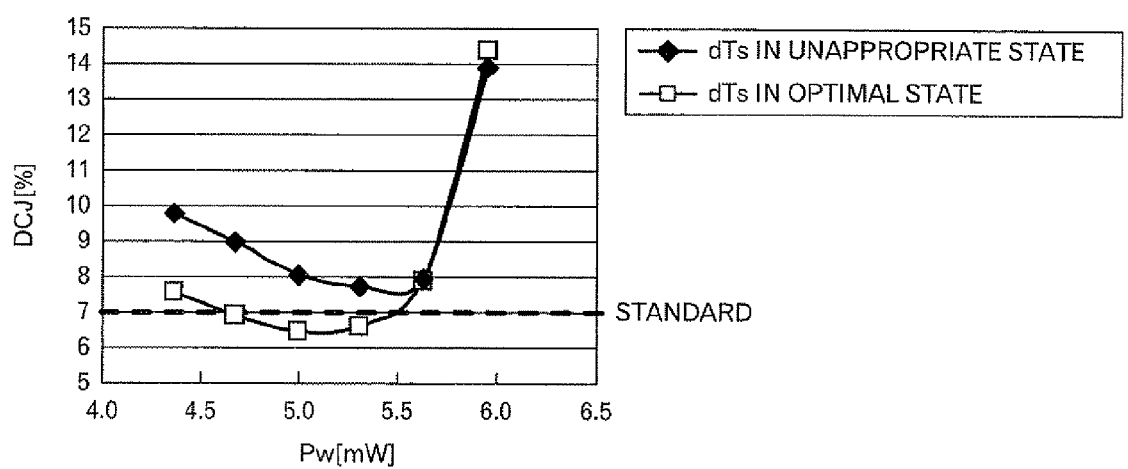
FIG. 3 is a diagram depicting a relation between a write power Pw and DCJ in case of changing dTs.

FIG. 3 depicts a graph whose horizontal axis corresponds to a write power Pw in case where two dTs are used as a parameter, and whose vertical axis corresponds to DC jitter (Data To Clock Jitter, which indicates fluctuation in a time-axis direction of the digital signal. Hereinafter, abbreviated as DCJ [%]). One of two dTs represents dTs in the optimum state by a curve of squares with a blank inside, and the other represents dTs in unappropriate state by a curve of black lozenges. Thus, when dTs is made to the optimum state, a range of the write power Pw exists, in which DCJ can achieve a requirement of 7% and less, which is determined in the Blu-ray disc standard (hereinafter, abbreviated as "standard"). When dTs is in the unappropriate state, DCJ cannot achieve the requirement of 7% and less, which is determined in the standard, even if the write power Pw is changed. Although it is not depicted, the similar tendency is found for the space forming power Ps.

Figure 4:
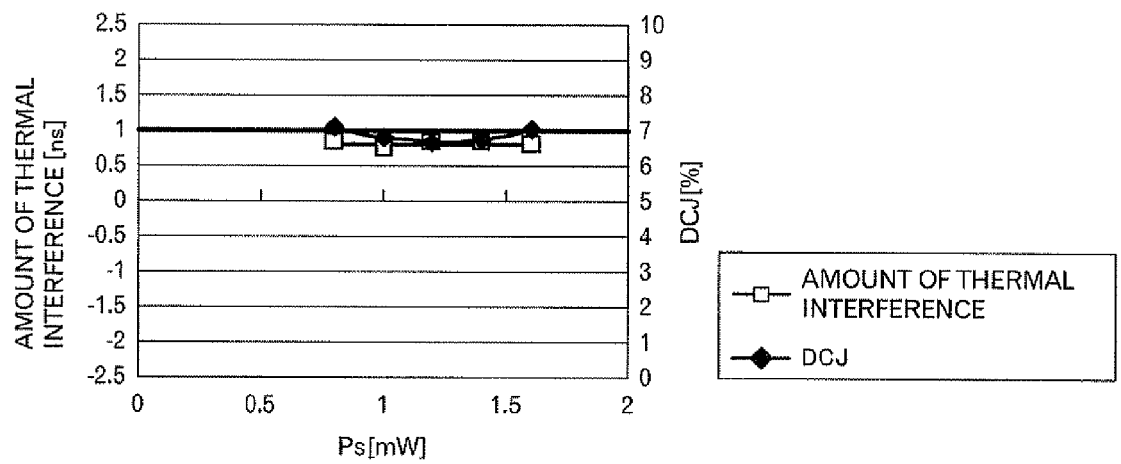
FIG. 4 is a diagram representing a relation between a space forming power Ps and thermal interference amount or DCJ in case of the optical information recording medium whose recording layer is made of an inorganic material.
Figure 5:
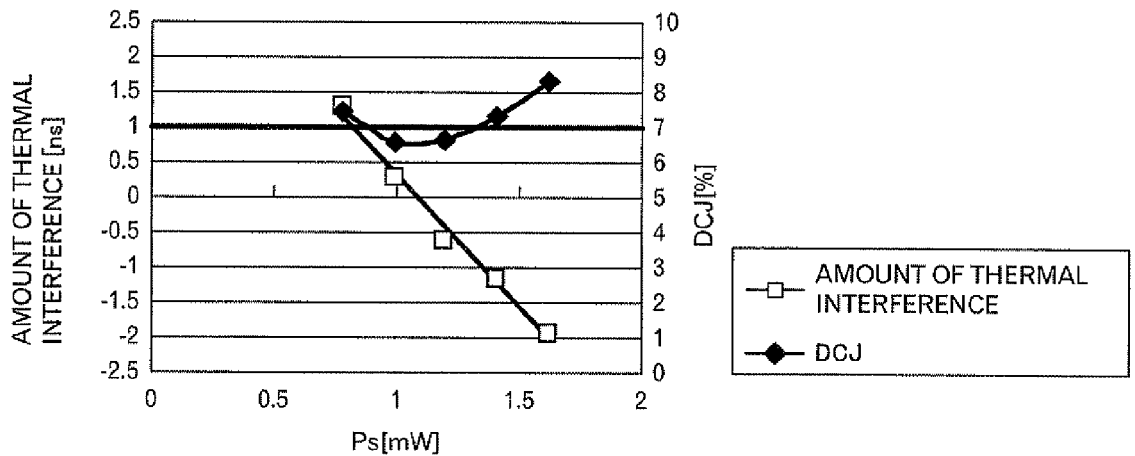
FIG. 5 is a diagram representing a relation between the space forming power Ps and the thermal interference amount or DCJ in case of the optical information recording medium for a bluish-purple laser, whose recording laser is made of an organic dye having the absorption spectrum at the wavelength λ=405 nm.

As described above, the patent document 1 discloses a technique for optimizing the pulse width dTs of the cooling pulse for the write-once type optical information recording medium whose recording layer is made of the inorganic material. FIG. 4 depicts the recording characteristic DCJ [%] and thermal interference amount [ns] in case where the pulse width dTs of the cooling pulse is fixed to 1.5 [T] and the recording to BD-R whose recording layer is made of the inorganic material is carried out while changing the space forming power Ps. In FIG. 4, the horizontal axis represents the space forming power Ps [mW], the left vertical axis represents the thermal interference amount [ns], the right vertical axis represents DCJ [%], the squares with a blank inside represent the thermal interference amount [ns] when changing the space forming power Ps, and the black lozenges represent DCJ [%] when changing the space forming power Ps. Incidentally, the thermal interference amount was measured by measuring a length A of a mark with a particular symbol length, which is recorded after a shortest space after a mark with a certain length, and a length B of a mark with the same particular symbol length, which is recorded after a longest space after a mark with a certain length, and calculating a difference between the lengths A and B of the marks. As depicted in FIG. 4, in case where the recording layer is made of the inorganic material, DCJ and the thermal interference are not changed so much even if the space forming power Ps is changed. On the other hand, FIG. 5 depicts the recording characteristic and the thermal interference amount in case where the recording is carried out to BD-R whose recording layer is made of the organic dye while the pulse width dTs of the cooling pulse is fixed to 1.5 [T] and the space forming power Ps is changed. FIG. 5 is a graph similar to FIG. 4. However, when changing the space forming power Ps, the thermal interference amount changes widely. Then, DCJ deteriorates over 7%, which is a maximum reference value of DCJ, with the decrease of the thermal interference amount. Thus, it can be understood that the thermal interference is influenced and the recording characteristic DCJ [%] deteriorates in case of the write-once type optical information recording medium whose recording layer is made of the organic dye. Therefore, it became clear that it is necessary to optimize not only the pulse width dTs of the cooling pulse but also the space forming power Ps for the respective mediums.

More specifically, when the pulse width dTs of the cooling pulse is prolonged, it is possible to eliminate the influence of the terminal interference and to improve the recording characteristic by lowering a ratio $\epsilon_s$ whose denominator is the write power and whose numerator is the space forming power Ps for the write power (Ps/Pw: hereinafter, called "ratio $\epsilon_s$" or "$\epsilon_s$"). However, because the remaining heat becomes insufficient when the ratio $\epsilon_s$ of the space forming power Ps to the write power Pw is lowered too much, and the asymmetry value does not reach the standard value, a lower limit of the ratio $\epsilon_s$ and an upper limit of the pulse width dTs of the cooling pulse are set.

In addition, when the aforementioned ratio $\epsilon_s$ rises too much, the space forming power Ps rises too much, and the organic dye reacts and the recording characteristic DCJ [%] deteriorates. Therefore, the upper limit is set for the ratio $\epsilon_s$. Furthermore, when the pulse width dTs of the cooling pulse becomes too short, the trailing edge of the recording mark is not sharply recorded, and the recording characteristic DCJ [%] deteriorates. Therefore, the lower limit is set for the pulse width dTs of the cooling pulse. As described above, the inventors of this application found following matters in the recording of the write-once type optical information recording medium whose recording layer is made of the organic material. Namely, when the recording speed is fixed, the ratio $\epsilon_s$ has the upper limit and lower limit, which define the preferable range, the pulse width dTs of the cooling pulse also has the upper limit and lower limit, which define the preferable range, and the space forming power Ps also has the upper limit and lower limit, which define the preferable range, in relation to the ratio $\epsilon_s$ and the write power Pw.

Figure 6:
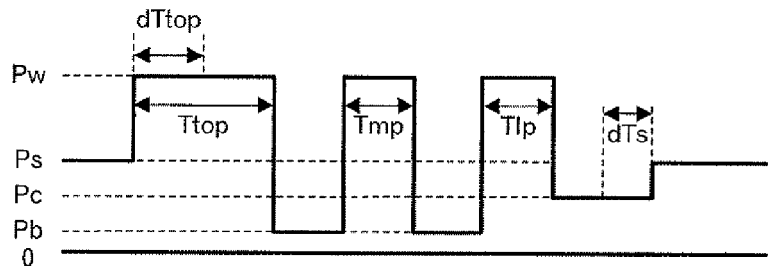
FIG. 6 is a diagram depicting an example of a multi-pulse type write strategy.

Incidentally, in the embodiment of this invention, as depicted in FIG. 6, data is recorded onto the optical information recording medium according to a so-called "multi-pulse type" write strategy, which includes a top pulse, muddle pulses, last pulse and cooling pulse and space forming pulse. In such a write strategy, it is important that the write power Pw for the top pulse, muddle pulses and last pulse, the cooling power Pc for the cooling pulse and the space forming power Ps for the space forming pulse are respectively controlled to emit the beam from a light source. As for the pulse other than the aforementioned pulses, the data recording method is used in which the recording mark is formed by the laser beam modulated so as to emit the beam from the light source by controlling the bias power Pb.

In the following, it will be explained how $\epsilon_s$ and the pulse width dTs of the cooling pulse should be set, specifically. FIG. 7 depicts the recording characteristic when $\epsilon_s$ is fixed to 0.24, and the cooling pulse width dTs is changed to 1.75 [T], 1.625 [T], 1.5 [T] and 1.125 [T]. Namely, the vertical axis represents DCJ [%] and the horizontal axis represents the write power Pw [mW]. Because the standard includes a requirement that DC jitter is equal to or less than 7%, DCJ always exceeds 7% in states of dTs=1.75 [T] and dTs=1.125 [T] according to this requirement. In case of a high-density write-once type optical information recording medium whose recording layer is made of the organic dye having the absorption spectrum at the wavelength λ=405 nm, when the pulse width dTs of the cooling pulse Pc is too long, the influence of the thermal interference depends on the mark length to form dTs equal to or longer than 1.75 [T], for example, and the recording characteristic deteriorates. In addition, when the pulse width dTs of the cooling pulse Pc is too short, for example, when dTs is equal to or less than 1.125 [T], the trailing edge of the recording mark is not sharply recorded, and the recording characteristic deteriorates. As a result, when $\epsilon_s$ is equal to 0.24, a range of dTs that the recording can be carried out favorably is a range from 1.5 [T] to 1.625 [T].

Similarly, FIG. 8 depicts measurement results of the relationship between $\epsilon_s$ and dTs, which satisfies the aforementioned requirement of the recording characteristic, when $\epsilon_s$ is fixed to the respective values from 0.18 to 0.32, whose interval is 0.02. Incidentally, FIG. 8 depicts the numeric values in case of the double-speed recording "X2". In order to satisfy the aforementioned requirement of the recording characteristic, dTs should be a value from 1.5 to 1.9325 [T], when $\epsilon_s$ is equal to 0.20. When $\epsilon_s$ is equal to 0.22, dTs should be a value from 1.375 to 1.75 [T]. When $\epsilon_s$ is equal to 0.24, dTs should be a value from 1.25 to 1.625 [T]. When $\epsilon_s$ is equal to 0.26, dTs should be a value from 1.125 to 1.5 [T]. When $\epsilon_s$ is equal to 0.28, dTs should be a value from 1.0 to 1.3125 [T]. When $\epsilon_s$ is equal to 0.30, it was known that dTs should be a value from 0.875 to 1.125 [T].

Incidentally, it was confirmed that there is no value of the recording characteristic satisfying the aforementioned requirement when $\epsilon_s$ is equal to 0.18 and when $\epsilon_s$ is equal to 0.32. For example, as depicted in FIG. 9, when $\epsilon_s$ is fixed to 0.32 and the pulse width dTs of the cooling pulse is changed from 1.25 to 0.875 [T], it can be understood that it is impossible to satisfy the requirement defined in the standard that DCJ is equal to or less than 7%, even when the write power Pw is adjusted. Thus, when $\epsilon_s$ is heightened to 0.32, the space forming power Ps is heightened too much, and the organic dye reacts. Accordingly, the recording characteristic deteriorates. According to the aforementioned reason, 0.30 is set to the upper limit of $\epsilon_s$ when the recording speed is "2X".

Figure 10:
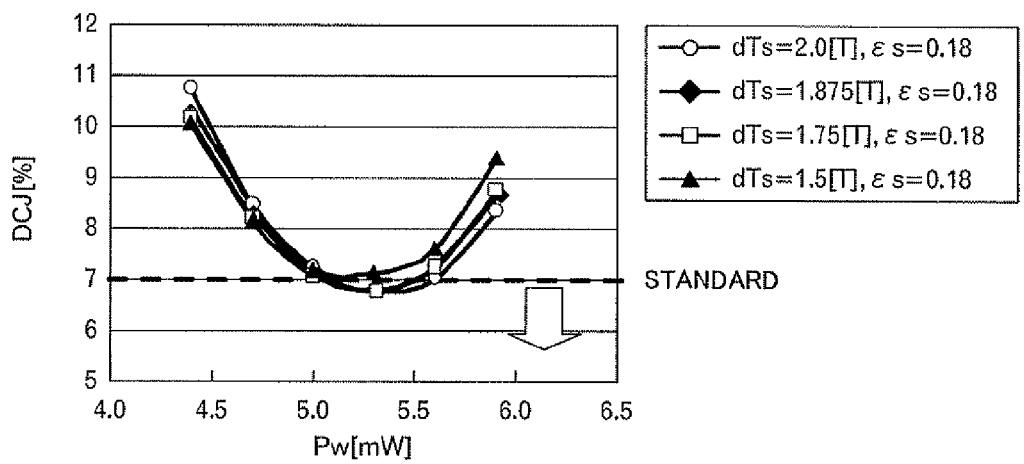
FIG. 10 is a diagram representing the relation between the write power Pw and DCJ in case of changing dTs while fixing $\epsilon_s$ to 0.18.
Figure 11:
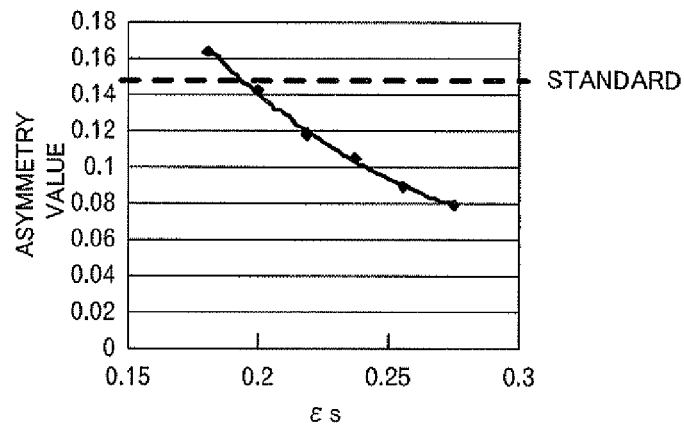
FIG. 11 is a diagram representing a relation between $\epsilon_s$ and asymmetry value.

On the other hand, as depicted, for example, in FIG. 10, when $\epsilon_s$ is fixed to 0.18, the pulse width dTs of the cooling pulse is changed from dTs=1.5 to 2.0 [T], it is possible to suppress the thermal interference by the adjustment of the write power Pw, when $\epsilon_s$ is lowered to 0.18. Therefore, states exist that values of DCJ satisfy the standard. However, as depicted in FIG. 11, it becomes impossible to satisfy a requirement, which is another requirement defined in the standard, namely, the asymmetry value is equal to or less than 0.15. In FIG. 11, the horizontal axis represents $\epsilon_s$, and the vertical axis represents the asymmetry value. Namely, when $\epsilon_s$ is less than about 0.2, the asymmetry value exceeds 0.15. This is because it becomes difficult for a mark of the shortest mark length to be recorded, the asymmetry value becomes plus and the aforementioned requirement cannot be satisfied, since the space forming power Ps is lowered by lowering $\epsilon_s$ and the sufficient remaining heat to form the mark is not transmitted.

Figure 12:
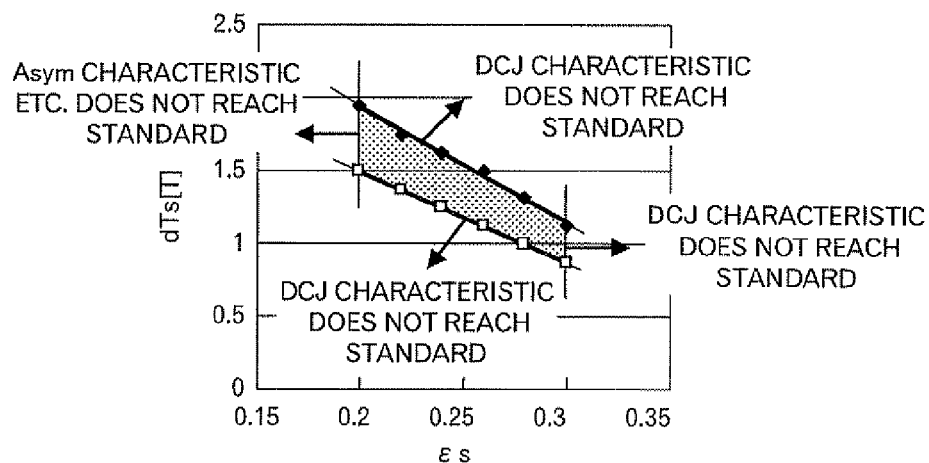
FIG. 12 is a diagram representing a relation $\epsilon_s$ and dTs to obtain favorable recording characteristic.

Therefore, considering the thermal characteristic of the write-once type optical information recording medium whose recording layer is made of the organic dye having the absorption spectrum at the wavelength $\lambda=405$ nm, the recording characteristic satisfying the standard can be obtained when dTs and the ratio $\epsilon_s$ have a relation depicted in FIG. 12. In FIG. 12, the vertical axis represents dTs [T], and the horizontal axis represents $\epsilon_S$. Specifically, in a plane of rectangular coordinates, in which dTs and $\epsilon_s$ correspond to coordinate axes, when ($\epsilon_s$, dTs) is within a region surrounded by (0.2, 1.9375), (0.2, 1.5), (0.3, 1.125) and (0.3, 0.875), the favorable recording characteristic can be obtained. Incidentally, as depicted in FIG. 12, a straight line connecting (0.2, 1.9375) and (0.3, 1.125), which represent ($\epsilon_s$, dTs), represents a boundary that DCJ characteristic does not reach the standard. A straight line connecting (0.3, 1.125) and (0.3, 0.875), which represent ($\epsilon_s$, dTs), represents a boundary that DCJ characteristic does not reach the standard. In addition, a straight line connecting (0.2, 1.5) and (0.3, 0.875), which represent ($\epsilon_s$, dTs), represents a boundary that DCJ characteristic does not reach the standard. Furthermore, a straight line connecting (0.2, 1.9375) and (0.2, 1.5), which represent ($\epsilon_s$, dTs), represents a boundary that the asymmetry characteristic does not reach the standard. In short, although values on the lines are within a range of the standard, values outside the lines includes a range that the standard is not satisfied.

Figures 13, 15:
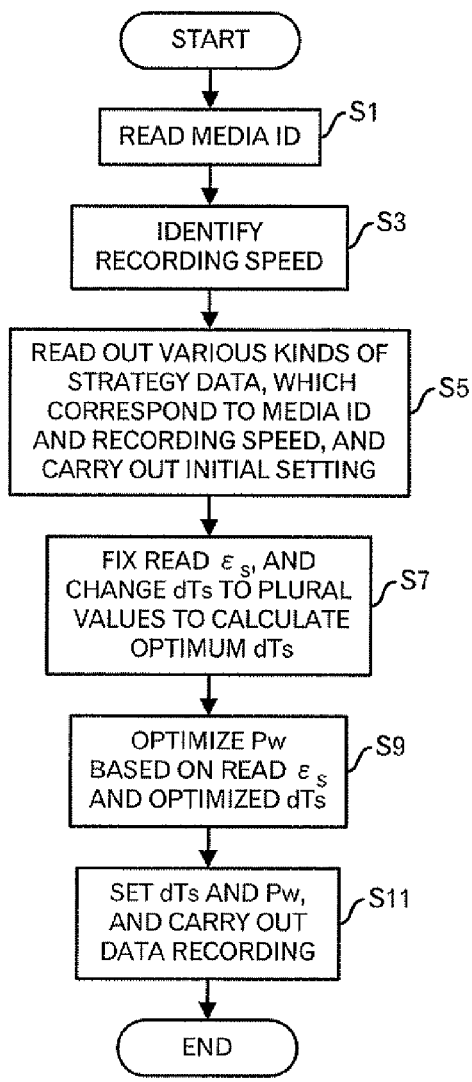
FIG. 13 is a diagram depicting a range of $\epsilon_s$ based on dTs.
FIG. 15 is a diagram depicting a first processing flow in the embodiment of this invention.

Incidentally, although FIG. 8 depicts a table defining a range of the pulse width dTs of the cooling pulse when $\epsilon_s$ is a reference, FIG. 13 depicts a table defining a range of $\epsilon_s$ when the pulse dTs of the cooling pulse is a reference. The table of FIG. 13 is a table at the double-speed recording "2X", too. In this case, when dTs is equal to 1.9325, it is necessary that $\epsilon_s$ is equal to 0.20. When dTs is equal to 1.75, it is necessary that $\epsilon_s$ is a value from 0.20 to 0.22. When dTs is equal to 1.625, it is necessary that $\epsilon_s$ is a value from 0.20 to 0.24. When dTs is equal to 1.5, it is necessary that $\epsilon_s$ is a value from 0.20 to 0.26. When dTs is equal to 1.375, it is necessary that $\epsilon_s$ is a value from 0.22 to 0.26. When dTs is equal to 1.25, it is necessary that $\epsilon_s$ is a value from 0.24 to 0.28. When dTs is equal to 1.125, it is necessary that $\epsilon_s$ is a value from 0.26 to 0.30.

Based on the aforementioned contents, one coordinate axis represents the ratio $\epsilon_s$ whose denominator is the write power Pw to form the recording mark and whose numerator is the space forming power Ps whose power value is less than the write power Pw. The other axis represents the pulse width dTs of the cooling power Pc (whose power value is less than the space forming power Ps) outputted immediately after the last pulse at the recording mark forming. In such a plane of rectangular coordinates, when a ratio $\epsilon_s$ within a predetermined range is determined by identifying a favorable region from pre-measured results, the range of the pulse width dTs of the cooling power Pc is determined. Therefore, by carrying out some test writing to a power calibration area (hereinafter, called PCA area) of the optical information recording medium by using the pulse widths dTs within the range, it is possible to select an optimum value of dTs. Also in case where the pulse width dTs within the preferable range is determined, it is possible to select, an optimum value of the ratio $\epsilon_s$, similarly, by carrying out some test writing by using the ratios $\epsilon_s$ within the favorable range in the plane of rectangular coordinates. In addition, because the ratio $\epsilon_s$ is clarified, it becomes possible to carry out the optimum recording to the optical information recording medium such as BD-R, when either of the write power Pw and the cooling power Pc and the pulse width dTs of the cooling power Pc are determined. By applying this principle, it is possible to provide an optical information recording apparatus and its method for carrying out the optimum recording to the optical information recording medium such as BD-R.

Embodiment

Figure 14:
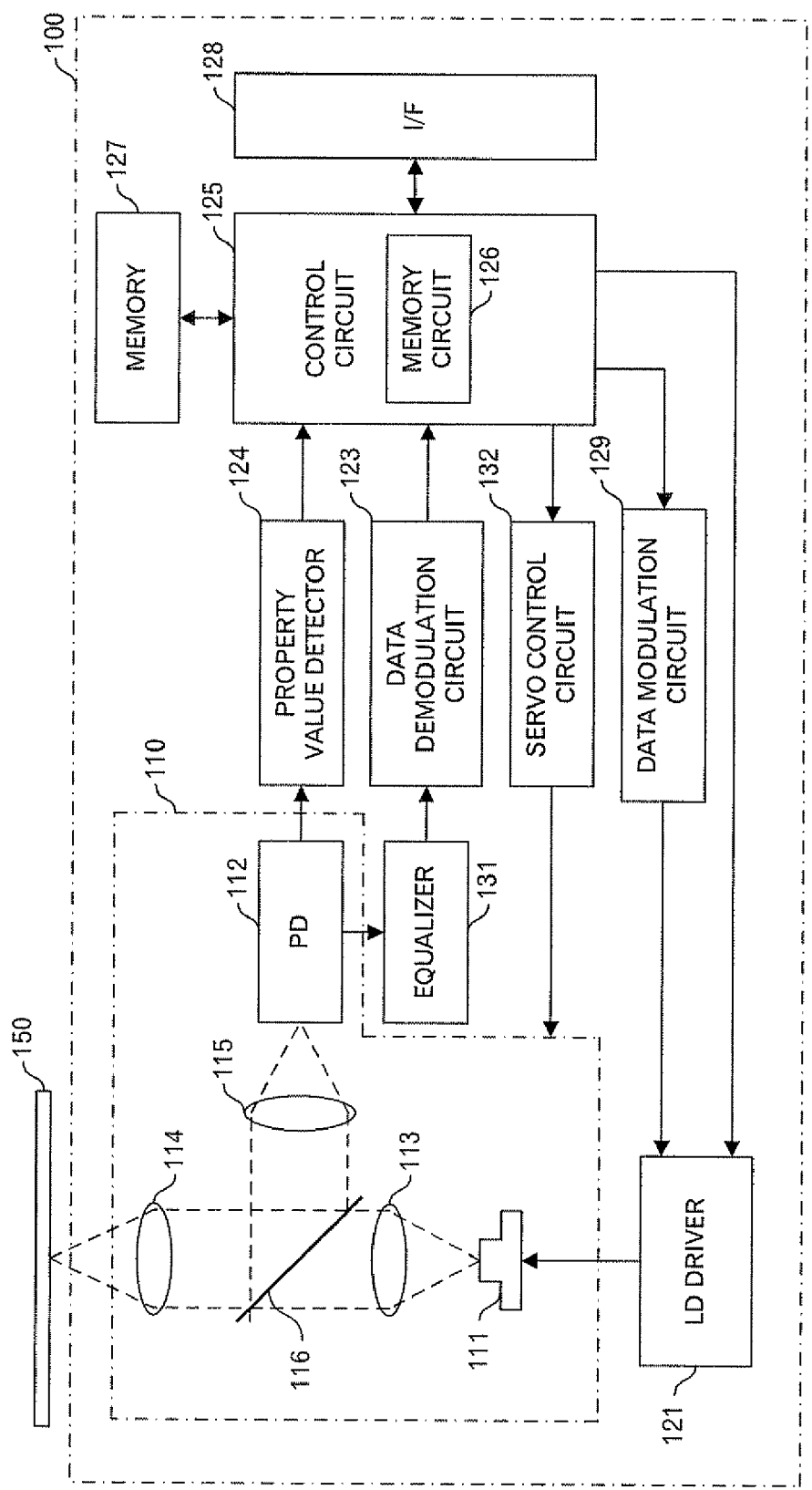
FIG. 14 is a functional block diagram in an embodiment of this invention.

Functional blocks of a drive system in the embodiment of this invention will be explained by using FIG. 14. The drive system relating to the embodiment of this invention includes an optical information recording/playback apparatus 100 and an input/output system (not depicted) including a display unit and an operation unit such as a remote controller.

The optical information recording recording/playback device 100 includes a memory 127 storing data under processing, data of processing results, reference data in the processing and so on; a control circuit 125, which includes a central processing unit (CPU) including a memory circuit 126 in which a program for causing to carry out a processing described below is recorded; an interface unit (hereafter, abbreviated as "I/F") 128, which is an interface with an input/output system; a property value detector 124 for detecting the maximum amplitude level or the minimum amplitude level of a RF signal which is a regenerative signal, and the like; an equalizer 131 and data demodulation circuit 123 to carry out a processing for decoding read codes such as 2T to 8T codes from the RF signal that is the regenerative signal, (e.g. in case of the standard, 9T, which is a synchronization code, is also identified. Also, in case of the HD-DVD standard, 2T code to 11T code and 13T code, which is a synchronization code, are identified); a pickup unit 110; a data modulation circuit 129 for carrying out predetermined modulation to data to be recorded, which is outputted from the control circuit 125, and outputting modulated data to a laser diode (hereafter, abbreviated as "LD") driver 121; and a servo control circuit 132 for a rotation control unit and motor of an optical information recording medium 150 for the bluish-purple laser, whose recording layer is made of the organic dye having the absorption spectrum at the wavelength λ=405 nm, and the pickup unit 110, and so forth.

Data of combinations of the pulse width dTs of the cooling pulse and the ratio $\epsilon_s$ of the space forming power Ps to the write power, which satisfy the condition described in the principle of this embodiment, namely the favorable region, is stored in the memory 127. Specifically, the table as depicted in FIG. 8 and/or the table as depicted in FIG. 13 may be stored as the favorable region, for each recording speed and each media ID, as it is. Incidentally, it is assumed that a value to be used as an initial value is identified among them. In addition, only portions especially used among the table as depicted in FIG. 8 and the table as depicted in FIG. 13 may be stored. Furthermore, only one of the aforementioned combinations may be stored for each recording speed and each media ID, and it may be used as it is. Such respective piece of stored data is read from the recording source and effectively used at the recording.

In addition, the pickup unit 110 includes an objective lens 114, a beam splitter 116, a detection lens 115, a collimator lens 113, an LD 111, and a photo detector (hereafter, abbreviated as "PD") 112. In the pickup unit 110, an actuator, which is not depicted, operates according to control of the servo control circuit 132, and then, focusing and tracking are carried out.

The control unit 125 is connected to the memory 127, property value detector 124, data demodulation circuit 123, I/F 128, LD driver 121, data modulation circuit 129, a servo control circuit 132 and rotation control unit, which is not depicted, and so forth. Also, the property value detector 124 is connected to the PD 112, control circuit 125 and so forth. The LD driver 121 is connected to the data modulation circuit 129, control circuit 125, and LD 111. The control circuit 125 is also connected to the input/output system through the I/F 128.

Next, description will be made regarding an overview of a processing in case of recording data to the optical information recording medium 150. First, the control circuit 125 controls the data modulation circuit 129 to carry out a predetermined modulation processing to data to be recorded onto the optical information recording medium 150. Then, the data modulation circuit 129 outputs the data after the modulation processing to the LD driver 121. The LD driver 121 drives the LD 111 by using the received data in accordance with the strategy and parameters, which are designated recording conditions, to output a laser beam. The laser beam is irradiated onto the optical information recording medium 150 through the collimator lens 113, beam splitter 116, and objective lens 114, and then marks and spaces are formed on the optical information recording medium 150.

In addition, description will be made regarding an overview of a processing in case of playing back the data recorded on the optical information recording medium 150. According to instructions from the control circuit 125, the LD driver 121 drives and causes the LD 111 to output a laser beam. The laser beam is irradiated onto the optical information recording medium 150 through the collimator lens 113, beam splitter 116, and objective lens 114. The reflected beam from the optical information recording medium 150 is inputted to the PD 112 through the objective lens 114, beam splitter 116, and detection lens 115. The PD 112 converts the reflected beam from the optical information recording medium 150 into an electric signal, and outputs the signal to the property value detector 124 and so forth. The equalizer, data modulation circuit 123 and the like carry out a predetermined decoding processing for the outputted regenerative signal, outputs the decoded data to the display unit of the input/output system through the control circuit 125 and I/F 128, and causes the display unit to display the playback data. The property value detection unit 124 is not employed for the ordinary playback.

Next, description will be made regarding a processing in case of recording data onto the optical information recording medium 150 with reference to FIG. 15. First, the control circuit 125 reads out a media ID recorded on the optical information recording medium 150 by regenerating through the PD 112, equalizer 131 and data modulation circuit 123 (step S1). In addition, the control circuit 125 accepts an instruction of the recording speed from, for example, a user through the I/F 128, and identifies the recording speed (step S3). Incidentally, this identification of the recording speed may be made by other methods, for example, a preset recording speed may be identified. Then, the control circuit 125 reads out various kinds of strategy data and the like, which correspond to the read media ID and identified recording speed, from the recording source such as the memory 127, and sets the read data into the LD driver 121 as the initial setting (step S5). The various kinds of strategy data has the relation described in the column of the principle of this embodiment. The various kinds of strategy data includes values of the ratio $\epsilon_s$ of the space forming power Ps to the write power Pw and values of the pulse width dTs of the cooling pulse, namely the tables depicted in FIGS. 8 and 13. Steps until this are basic and almost common. However, because some methods may be adopted for the processing after the setting, those modes will be explained in the following based on FIGS. 15 to 17.

Here, the control circuit 125 fixed the write power Pw and the ratio $\epsilon_s$ of the space forming power Ps to the write power Pw to the read values based on the initial setting at the step S5. The control circuit 125 carries out an optimization processing of the pulse width dTs of the cooling pulse based on the fixed ratio $\epsilon_s$, while changing the pulse width dTs of the cooling pulse within the range depicted in FIG. 8 or 12, at regular intervals (step S7). For example, when the read $\epsilon_s$ is equal to 0.24, the pulse width dTs of the cooling pulse is a value in a range from 1.25 [T] to 1.625 [T], from the table similar to FIG. 8. The pulse width depends on the resolution of LSI. In this case, when the resolution is 0.0625 [T], dTs is changed to 1.25T, 1.3125T, 1.375T, 1.4375T, 1.5T, 1.5625T and 1.625T. The dTs having the best characteristic among such changes is selected. The optimization processing is carried out by the well-known optimum recording power control (Optimum Power Control. Hereinafter, abbreviated as "OPC"). Namely, the test recording is carried out for each strategy including the predetermined write power Pw, the cooling pulse Pc based on the fixed ratio $\epsilon_s$ and the aforementioned changed pulse width dTs, and for each case, for example, the asymmetry value or β value is calculated. Then, the case where the asymmetry value or β value becomes the best value is adopted as the optimum value. At this time, the property value detector 124 detects property values required for calculating the asymmetry values or β values. Thus, the processing at the step S7 to determine the optimum value of the pulse width dTs of the cooling pulse is completed. Then, the control circuit 125 also calculates the optimum value of the write power Pw by the well-known processing (OPC), based on the fixed ratio $\epsilon_s$ and the optimized pulse width dTs of the cooling pulse (step S9).

Then, the control circuit 125 sets the optimized write power Pw, the space forming power Ps determined by the ratio $\epsilon_s$ of the space forming power Ps to this write power Pw and the optimized pulse width dTs of the cooling pulse to the LD driver 121, and carries out the data recording according to this setting (step S11).

Figure 16:
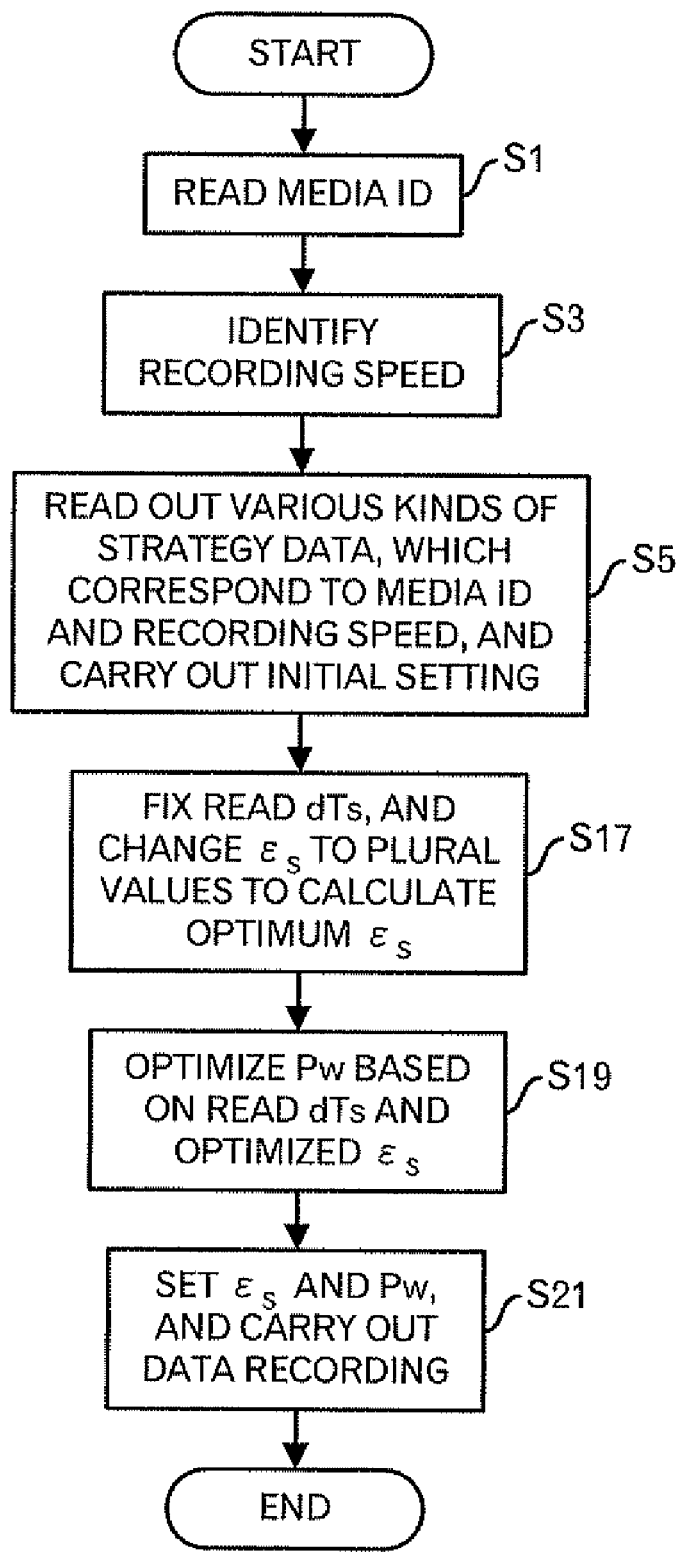
FIG. 16 is a diagram depicting a second processing flow in the embodiment of this invention.

Next, as for a mode of FIG. 16, which is different from FIG. 15, the step S17 and subsequent will be explained, because the steps S1 to S5 are the same. Also in this case, the control circuit 125 fixes the write power Pw and the pulse width dTs of the cooling pulse to the read values based on the initial setting at the step S5. The control circuit 125 carries out an optimization processing of the ratio $\epsilon_s$ of the space forming power to the write power Pw based on the fixed pulse width dTs, while changing the ratio within the range depicted in FIG. 13 or 12 at regular intervals (step S17). For example, when the read dTs is equal to 1.375 [T], the ratio $\epsilon_s$ of the space forming power is a value in a range from 0.22 to 0.26 according to FIG. 13. Although the ratios depend on the resolution of LSI, $\epsilon_s$ are changed to 0.22, 0.23, 0.24, 0.25 and 0.26, because the resolution is 0.01 in this case. This optimization processing is based on the well-known processing (OPC). Namely, the test recording is carried out onto the test recording area of the optical information recording medium 150 for each strategy of the predetermined write power Pw, the pulse width dTs of the cooling pulse and the changed ratio $\epsilon_s$ of the space forming power to the write power Pw, and for each case, for example, the asymmetry value or β value is calculated, and the case that the asymmetry value or β value becomes the best value is adopted as the optimum value. At that time, the property value detector 124 detects the property values required for the calculation of the asymmetry values or β values. Thus, the processing of the step S17 to determine the optimum value of the ratio $\epsilon_s$ is completed. Then, the control circuit 125 also determines the optimum value of the write power Pw by the well-known processing (OPC) based on the fixed pulse width dTs of the cooling pulse and the optimized ratio $\epsilon_s$ (step S19).

Then, the control circuit 125 sets the optimized write power Pw, the space forming power Ps determined by the optimized ratio $\epsilon_s$ of the space forming power Ps to this write power Pw and the pulse width dTs of the cooling pulse to the LD driver 121, and carries out the data recording according to this setting (step S21).

Figure 17:
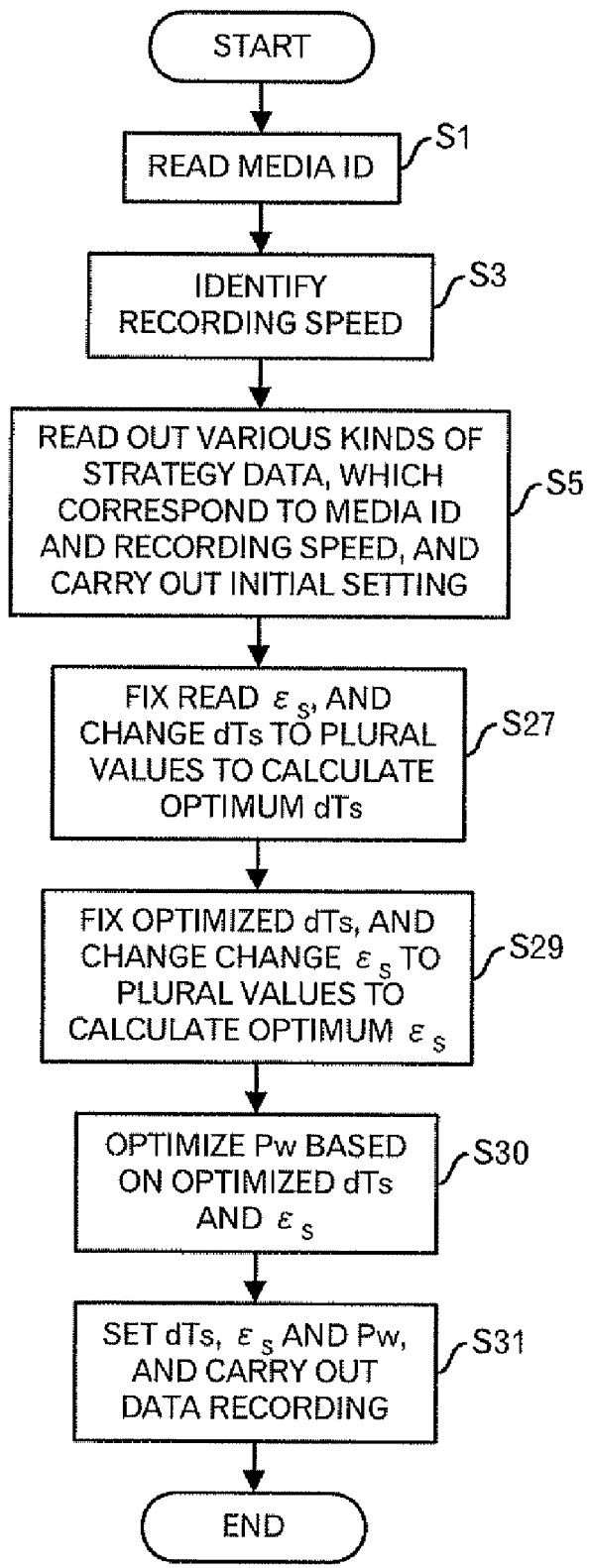
FIG. 17 is a diagram depicting a third processing flow in the embodiment of this invention.

Next, as for a mode of FIG. 17, the step S27 and subsequent will be explained, because the steps S1 to S5 are the same. Also in this case, the control circuit 125 fixes the write power Pw and the ratio $\epsilon_s$ of the space forming power Ps to the write power Pw to the read values based on the initial setting at the step S5. The control circuit 125 carries out an optimization processing of the pulse width dTs of the cooling pulse based on the fixed ratio $\epsilon_s$, while changing the pulse width dTs of the cooling pulse within the range depicted in FIG. 8 or 12 at regular intervals (step S27). For example, when the read $\epsilon_s$ is equal to 0.24, the pulse width dTs of the cooling pulse is a value in a range from 1.25 [T] to 1.625 [T] according to FIG. 8. The pulse width depends on the resolution of LSI. In this case, the resolution is 0.0625 [T] and, dTs is changed to 1.25T, 1.3125T, 1.4375T, 1.5T, 1.5625T and 1.625T. Because the optimization processing, which is the well-known processing (OPC), is the same as the case of the step S9, the explanation is omitted. Anyway, by the similar processing to the case of the step S9, the processing of the step S27 to determine the optimum value of the pulse width dTs of the cooling pulse is completed.

Then, the control circuit 125 carries out the optimization processing of the ratio $\epsilon_s$ based on the optimized pulse width dTs, while changing the ratio $\epsilon_s$ of the space forming power to the write power Pw in the range depicted in FIG. 12 or 13 in regular intervals (step S29). For example, when dTs derived by the optimization processing of the step S27 is equal to 1.375 [T], the ratio $\epsilon_s$ of the space forming power is a value in a range from 0.22 to 0.26 according to FIG. 13. The ratio depends on the resolution of LSI. In this case, $\epsilon_s$ is changed to 0.22, 0.23, 0.24, 0.25 and 0.26 when the resolution is equal to 0.01. The optimization processing is based on the well-known processing (OPC). Incidentally, a method for respectively carrying out the test recording to the test recording area on the optical information recording medium 150 and adopting, as the optimum value, a case where the asymmetry value or p value becomes the best value is the same as the aforementioned one. Therefore, the explanation is omitted. Thus, the processing of the step S29 to determine the optimum value of the ratio $\epsilon_s$ is completed. Next, the control circuit 125 also calculates the optimum value of the write power Pw by the well-known processing (OPC) based on the optimized pulse width dTs of the cooling pulse and the optimized ratio $\epsilon_s$ (step S30).

Then, the control circuit 125 sets the optimized write power Pw, the space forming power Ps determined by the optimized ratio $\epsilon_s$ of the space forming power Ps to this write power Pw and the optimized pulse width dTs of the cooling pulse to the LD driver 121, and carries out the data recording according to this setting (step S31).

By carrying out the aforementioned processing, it becomes possible to arrange the environment for the favorable recording, because the space forming power Ps determined from the optimum value of the ratio $\epsilon_s$ and the optimum value of the pulse width dTs of the cooling pulse in the relation as depicted in FIG. 8, 13 or 12.

Figure 18:
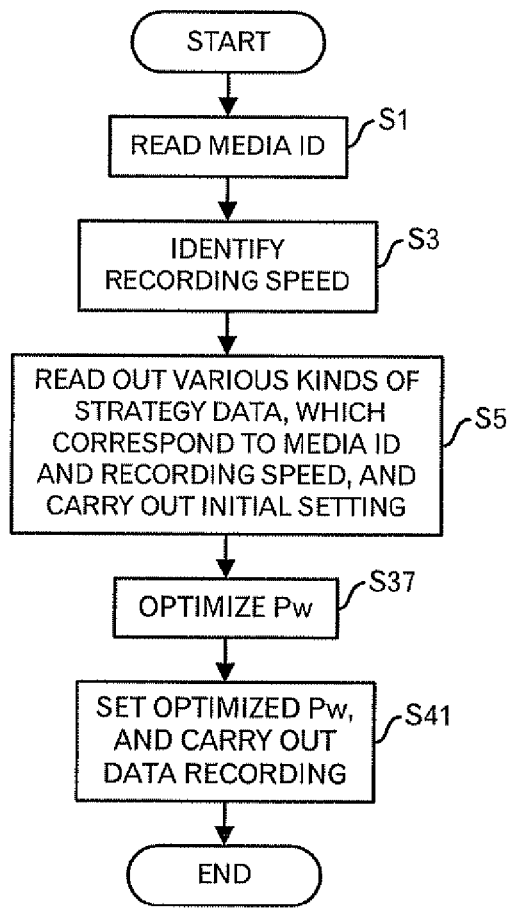
FIG. 18 is a diagram depicting a fourth processing flow in the embodiment of this invention.

In addition, when only one set of the ratio $\epsilon_s$ of the space forming power Ps to the write power Pw and the pulse width dTs of the cooling pulse, which have the relation as depicted in FIG. 8, 13 or 12, is stored in the memory 127, a processing as depicted in FIG. 18 will be carried out.

First, the control circuit 125 reads out a media ID recorded on the optical information recording medium 150 by regenerating through the PD 112, equalizer 131 and data modulation circuit 123 (step S1). In addition, the control circuit 125 accepts an instruction of the recording speed from, for example, a user through the I/F 128, and identifies the recording speed (step S3). Then, the control circuit 125 reads out various kinds of strategy data and the like, which correspond to the read media ID and identified recording speed, from the memory 127 or the like, and sets the read data into the LD driver 121 (step S5). Here, one set of the combination of the ratio $\epsilon_s$ of the space forming power Ps to the write power Pw and the pulse width dTs of the cooling pulse, which have the relation as depicted in FIG. 8, 13 or 12, is read out at this step, and Ps calculated from Pw and $\epsilon_s$ and the pulse width dTs of the cooling pulse are set in addition to the write power Pw.

Then, the control circuit 125 carries out the well-known processing (OPC) to optimize the write power Pw (step S37). Incidentally, at this time, the property value detector 124 detects the property values to calculate the asymmetry values or β values, and outputs them to the control circuit 125. The control circuit 125 calculates the asymmetry values or β values and calculates the optimized write power Pw.

After that, the control circuit 125 sets the optimized write power Pw calculated at the step S37 and the like to the LD driver 121, and carries out the data recording (step S41). The space forming power Ps calculated from $\epsilon_s$ and the optimum value of the write power Pw is also set.

By carrying out such a processing, the effect described in the principle of this embodiment can be obtained.

Figure 19:
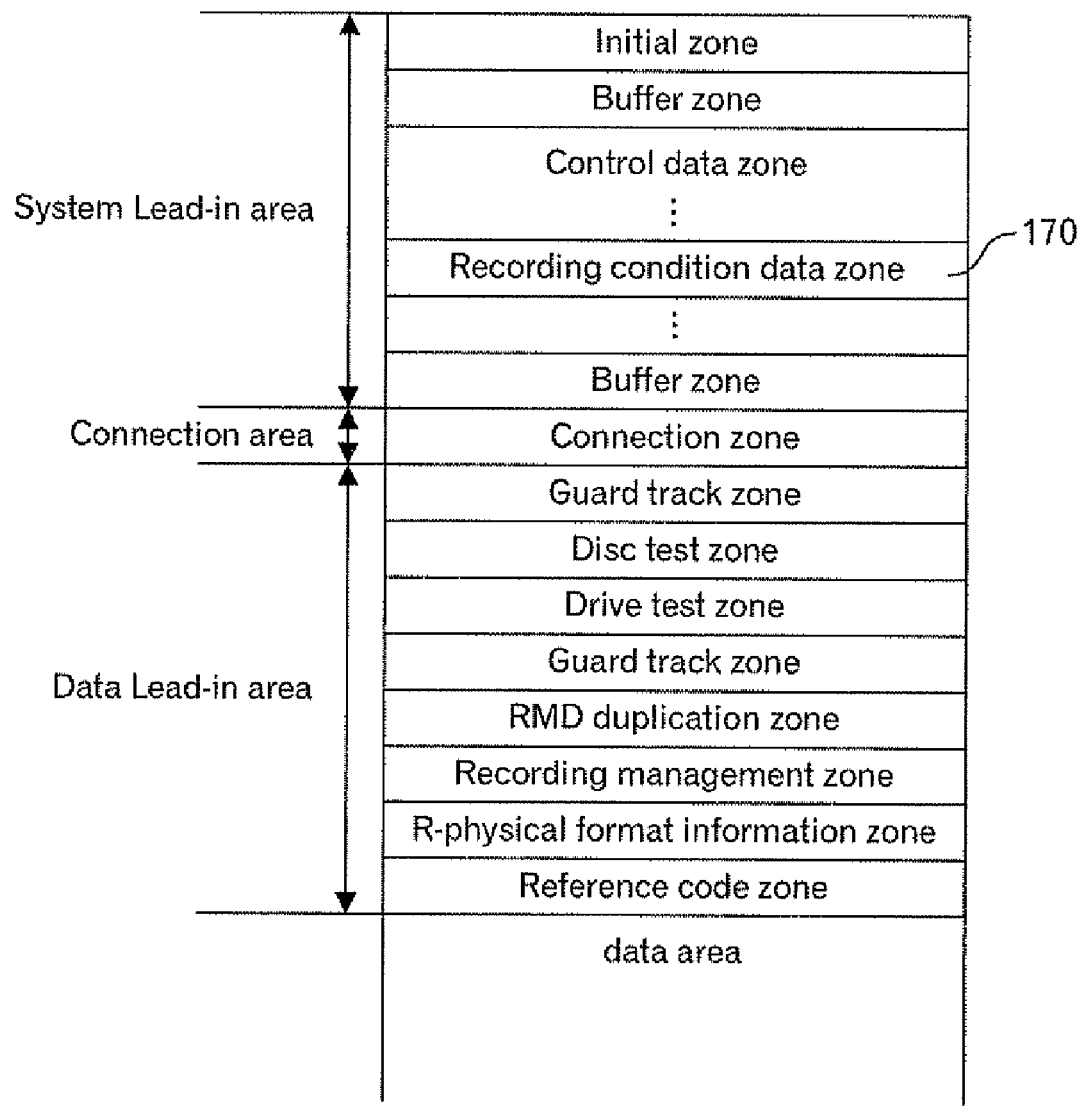
FIG. 19 is a diagram depicting a data structure stored in the optical information recording medium.

Incidentally, setting values of $\epsilon_s$ and dTs, which have the predetermined relation (FIG. 8, 13 or 12) described in the column of the principle of this embodiment may be stored in the memory 127 or may be stored in BCA (Burst Cutting Area) of the optical information recording medium 150. In case of causing the optical information recording medium 150 to hold, those are held in the Lead-in area such as depicted in FIG. 19. Lead-in area is roughly divided into a system Lead-in area, a connection area and data Lead-in area, and the system Lead-in area includes an initial zone, buffer zone, control data zone, and buffer zone. In addition, the connection area includes a connection zone. Furthermore, the data Lead-in area includes a guard track zone, disc test zone, drive test zone, guard track zone, RMD duplication zone, recording management zone, R-physical format information zone, and reference code zone. In the present embodiment, the control data zone of the system Lead-in area includes a recording condition data zone 170. For example, $\epsilon_s$ and dTs, which have the predetermined relation described in the column of the principle of this embodiment, and the like may be held in the recording condition data zone 170, and they are read out from this zone to use.

Although the embodiment of this invention was explained above, this invention is not limited to this. For example, the functional block diagram in FIG. 14 is depicted to explain the embodiment, and it may not always match with any actual circuits and/or module configuration. In addition, as for the processing flow, even when the same processing result can be obtained, the processing order may be reordered and the processing may be executed in parallel.

Figure 20:
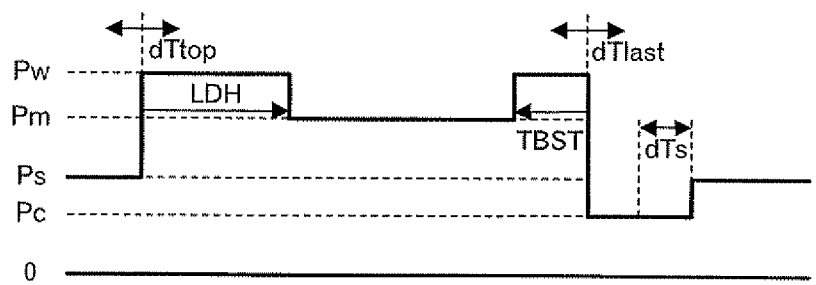
FIG. 20 is a diagram depicting an example of a castle-type write strategy.

Furthermore, although an example that the multi-pulse type write strategy is adopted was explained above, a data recording method may be used in which the recording marks are formed by the laser beam modulated so as to respectively irradiate the write power Pw for the top pulse and last pulse, middle power Pm for the middle pulse, cooling power Pc for the cooling pulse and the space forming power for the space forming pulse according to the so-called castle-type write strategy, which includes the top pulse, middle pulses, last pulse, cooling pulse and the space forming pulse, as depicted in FIG. 20.

The invention claimed is:

1. An optical information recording apparatus for recording information, the optical information recording apparatus being configured to form recording marks and spaces onto an optical information recording medium having a recording layer made of an organic dye, the recording layer having a predetermined absorption ratio to a light whose wavelength is 405 nm, the recording marks and spaces being formed by irradiating a laser of adjacent range wavelengths including said wavelength of 405 nm, the optical information recording apparatus comprising:

a setting unit to respectively set a write power to form said recording marks, a space forming power whose power value is less than said write power, to form said spaces, and a pulse width of a cooling pulse whose power value is less than said space forming power and which is output immediately after a last pulse when said recording mark is formed; and a unit to record information onto said optical information recording medium according to said setting unit, wherein the setting unit that sets said pulse width of said cooling pulse and a ratio whose denominator is said write power and whose numerator is said space forming power are determined from a pre-measured favorable region in a plane of rectangular coordinates in which one coordinate axis corresponds to said ratio and the other coordinate axis corresponds to said pulse width of said cooling pulse, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

2. An optical information recording and reproducing apparatus for recording information, the optical information recording and reproducing apparatus being configured to form recording marks and spaces onto an optical information recording medium having a recording layer made of an organic dye, the recording layer having a predetermined absorption ratio to a light whose wavelength is 405 nm, the recording marks and spaces being formed by irradiating a laser of adjacent range wavelengths including said wavelength of 405 nm, the optical information recording and reproducing apparatus comprising:

an obtaining unit to obtain a favorable region obtained from a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;

a unit to optimize a value of said write power and a value of said pulse width included in said preferable range of said pulse width of said cooling pulse based on results of test recording carried out at a plurality of points in a test recording area of said optical information recording medium;

a setting unit to set an optimum value of said write power, a value of said space forming power, which is obtained from said optimum value of said write power and said ratio, and an optimum value of said pulse width of said cooling pulse; and a unit to record information onto said optical information recording medium according to said setting unit, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

3. The optical information recording and reproducing apparatus as set forth in claim 2, wherein said recording source is a memory in said optical information recording and reproducing apparatus or said optical information recording medium.

4. An optical information recording and reproducing apparatus for recording information, the optical information recording and reproducing apparatus being configured to form recording marks and spaces onto an optical information recording medium having a recording layer is made of an organic dye, the recording layer having a predetermined absorption ratio to a light whose wavelength is 405 nm, the recording marks and spaces being formed by irradiating a laser of adjacent range wavelengths including said wavelength of 405 nm, the optical information recording and reproducing apparatus comprising:

an obtaining unit to obtain a favorable region obtained from a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;

a unit to optimize a value of said write power and a value of said ratio in said preferable range of said ratio based on results of test recording carried out plural times in a test recording area of said optical information recording medium;

a setting unit to set an optimum value of said write power, a value of said space forming power, which is obtained from said optimum value of said write power and an optimum value of said ratio, and a value of said pulse width of said cooling pulse; and a unit to record information onto said optical information recording medium according to said setting unit, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represent a cycle of a reference clock.

5. The optical information recording and reproducing apparatus as set forth in claim 4, wherein said recording source is a memory in said optical information recording and reproducing apparatus or said optical information recording medium.

6. An optical information recording and reproducing apparatus for recording information, the optical information recording and reproducing apparatus being configured to form recording marks and spaces onto an optical information recording medium having a recording layer made of an organic dye, the recording layer having a predetermined absorption ratio to a light whose wavelength is 405 nm, the recording marks and spaces being formed by irradiating a laser of adjacent range wavelengths including said wavelength of 405 nm, the optical information recording and reproducing apparatus comprising:

an obtaining unit to obtain a favorable region obtained from a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;

a unit to optimize a value of said write power, a value of said ratio and a value of said pulse width of said cooling pulse, which corresponds to said ratio, based on results of test recording carried out at a plurality of points in a test recording area of said optical information recording medium;

a setting unit to set an optimum value of said write power, a value of said space forming power, which is obtained from said optimum value of said write power and an optimum value of said ratio, and an optimum value of said pulse width of said cooling pulse; and a unit to record information onto said optical information recording medium according to said setting unit, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

7. The optical information recording and reproducing apparatus as set forth in claim 6, wherein said recording source is a memory in said optical information recording and reproducing apparatus or said optical information recording medium.

8. An optical information recording method for recording information by forming recording marks and spaces onto an optical information recording medium having a recording layer made of an organic dye, the recording layer having a predetermined absorption ratio to a light whose wavelength is 405 nm, the recording marks and spaces being formed by irradiating a laser of adjacent range wavelengths including said wavelength of 405 nm; said optical information recording method comprising:

respectively setting a write power to form said recording marks, a space forming power whose power value is less than said write power, to form said spaces, and a pulse width of a cooling pulse whose power value is less than said space forming power and which is output immediately after a last pulse when said recording mark is formed; and recording information onto said optical information recording medium according to said setting, wherein said pulse width of said cooling pulse and a ratio whose denominator is said write power and whose numerator is said space forming power are determined from a pre-measured favorable region in a plane of rectangular coordinates in which one coordinate axis corresponds to said ratio and the other coordinate axis corresponds to said pulse width of said cooling pulse, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

9. The optical information recording method as set forth in claim 8, wherein said pulse width of said cooling pulse and said ratio whose denominator is said write power and whose numerator is said space forming power are determined based on results of test recording in which a numeric value on either of said coordinate axes in a range of said favorable region is fixed and a plurality of points are selected along the other coordinate axis in a range of said favorable region in said plane of rectangular coordinates in which one coordinate axis is said ratio and the other coordinate axis is said pulse width of said cooling pulse.

10. An optical information recording and reproducing method for recording information by forming recording marks and spaces onto an optical information recording medium having a recording layer made of an organic dye, the recording layer having a predetermined absorption ratio to a light whose wavelength is 405 nm, the recording marks and spaces being formed by irradiating a laser of adjacent range wavelengths including said wavelength of 405 nm; said optical information recording method comprising:
  obtaining a favorable region obtained based on a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;
  optimizing a value of said write power and a value of said pulse width included in said favorable range of said pulse width of said cooling pulse based on results of test recording carried out plural times in a test recording area of said optical information recording medium;
  setting an optimum value of said write power, a value of said space forming power, which is obtained from said optimum value of said write power and said ratio, and an optimum value of said pulse width of said cooling pulse; and
  recording information onto said optical information recording medium according to said setting, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

11. The optical information recording and reproducing method as set forth in claim 10, wherein said recording source is a memory in said optical information recording and reproducing apparatus or said optical information recording medium.

12. An optical information recording and reproducing method for recording information by forming recording marks and spaces onto an optical information recording medium having a recording layer is made of an organic dye, the recording layer having a predetermined absorption ratio to a light whose wavelength is 405 nm, the recording marks and spaces being formed by irradiating a laser of adjacent range wavelengths including said wavelength of 405 nm; said optical information recording method comprising:
  obtaining a favorable region obtained based on a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;
  optimizing a value of said write power and a value of said ratio in said preferable range of said ratio based on results of test recording carried out at a plurality of points in a test recording area of said optical information recording medium;
  setting an optimum value of said write power, a value of said space forming power, which is obtained from said optimum value of said write power and an optimum value of said ratio, and a value of said pulse width of said cooling pulse; and
  recording information onto said optical information recording medium according to said setting, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

13. The optical information recording and reproducing method as set forth in claim 12, wherein said recording source is a memory in said optical information recording and reproducing apparatus or said optical information recording medium.

14. An optical information recording and reproducing method for recording information by forming recording marks and spaces onto an optical information recording medium having a recording layer is made of an organic dye, the recording layer having a predetermined absorption ratio to a light whose wavelength is 405 nm, the recording marks and spaces being formed by irradiating a laser of adjacent range wavelengths including said wavelength of 405 nm; said optical information recording method comprising:
  obtaining a favorable region obtained based on a preferable range of a ratio whose denominator is a write power to form said recording mark and whose numerator is a space forming power whose power value is less than said write power, to form said spaces, and a preferable range of a pulse width of a cooling pulse whose power value is less than said space forming power and which is output immediately after a last pulse when said recording mark is formed, in a plane of rectangular coordinates in which one coordinate axis corresponds to said ratio and the other coordinate axis corresponds to said pulse width of said cooling pulse, from a recording source, which has recorded said favorable region in advance;

optimizing a value of said write power, a value of said ratio and a value of said pulse width of said cooling pulse, which corresponds to said ratio, based on results of test recording carried out plural times in a test recording area of said optical information recording medium;

setting an optimum value of said write power, a value of said space forming power, which is obtained from said optimum value of said write power and an optimum value of said ratio, and an optimum value of said pulse width of said cooling pulse; and recording information onto said optical information recording medium according to said setting, and wherein under the condition that recording is carried out at double-speed, said favorable region is a range connecting, by straight lines, points (0.2, 1.9375T), (0.2, 1.5T), (0.3, 1.125T) and (0.3, 0.875T), which respectively represent a combination of said ratio and said pulse width of said cooling pulse in said plane of rectangular coordinates, and T represents a cycle of a reference clock.

15. The optical information recording and reproducing method as set forth in claim 14, wherein said recording source is a memory in said optical information recording and reproducing apparatus or said optical information recording medium.

* * * * *